(No Model.) 2 Sheets—Sheet 1.
B. G. ROYAL.
GRAIN CLEANING AND SCALPING MACHINE.
No. 604,702. Patented May 24, 1898.
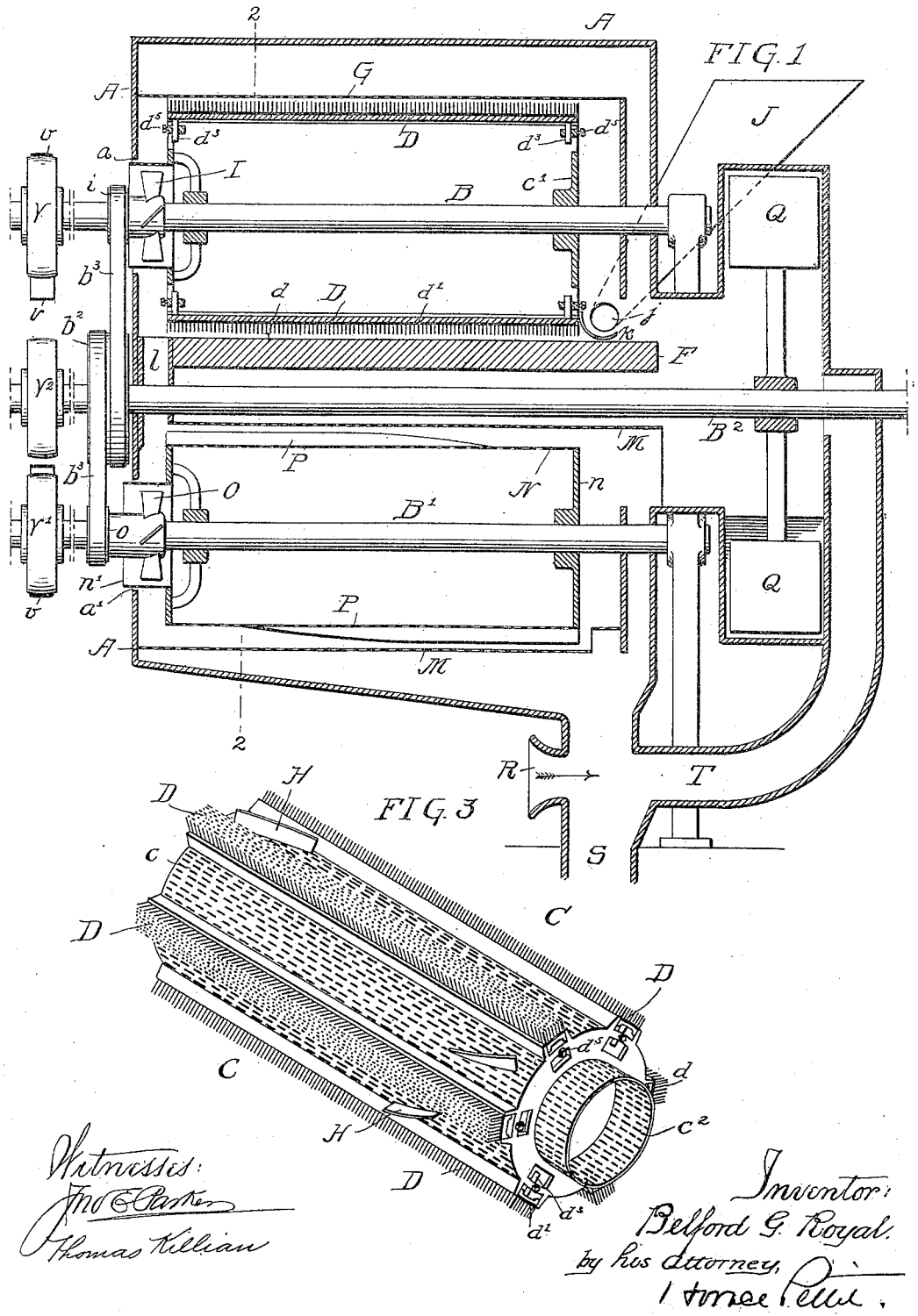
Witnesses:
Jno. E. Parker
Thomas Killian
Inventor:
Belford G. Royal.
by his attorney,

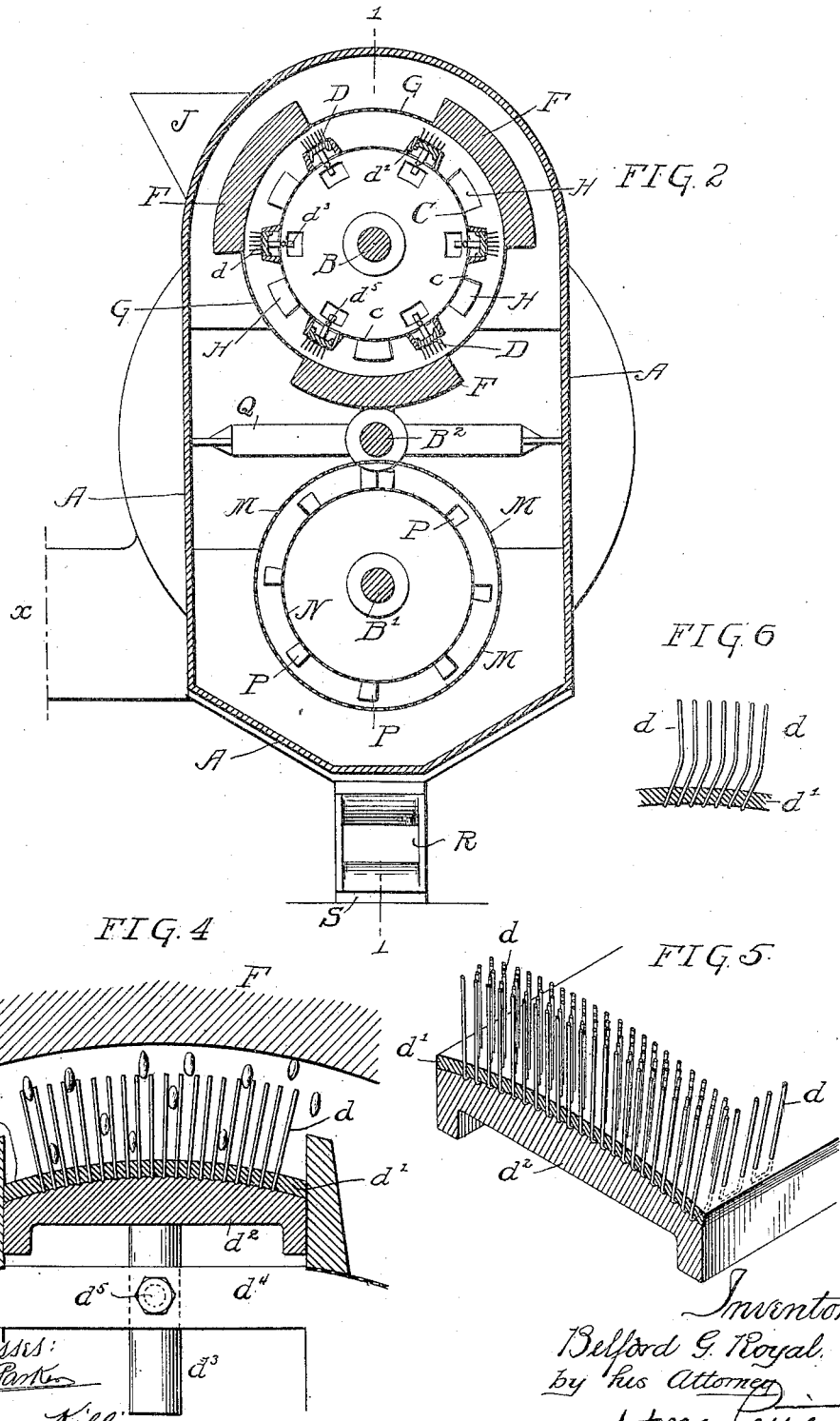

United States Patent Office.

BELFORD G. ROYAL, OF CAMDEN, NEW JERSEY, ASSIGNOR OF SEVEN-NINTHS TO RICHARD H. REEVE, OF SAME PLACE, ALEXANDER C. WOOD AND EDWARD S. WOOD, OF CINNAMINSON, NEW JERSEY, AND ELDRIDGE R. JOHNSON, OF PHILADELPHIA, PENNSYLVANIA.

GRAIN CLEANING AND SCALPING MACHINE.

SPECIFICATION forming part of Letters Patent No. 604,702, dated May 24, 1898.

Application filed March 22, 1897. Serial No. 628,601. (No model.)

*To all whom it may concern:*

Be it known that I, BELFORD G. ROYAL, a citizen of the United States, and a resident of Camden, county of Camden, State of New Jersey, have invented certain new and useful Improvements in Grain Cleaning and Scalping Machines, of which the following is a full, clear, and exact description, reference being had to the accompanying drawings, forming part of this specification.

My invention relates to certain improvements in that class of machines employed to remove the hulls from grains of wheat or other cereals in which a rotating drum acts to force the grains into contact with abrading-surfaces—a machine, for instance, such as that illustrated and described in United States Letters Patent granted to me on February 23, 1897, No. 577,538. In the machine described in said Letters Patent a series of brushes are secured to the periphery of a rotatable drum, each brush being formed of wire and adapted to force the grains of wheat into contact with the abrading-stones by more or less direct pressure, the ends of the teeth being arranged to travel within a very short distance of or in contact with the abrading-surface. The brushes described in said Letters Patent are made of steel wire or similar material secured to a metallic backing-bar which rigidly holds one end of each wire, so that in rotating any vibration of the wires due to the action of centrifugal force must take place at a point within the length of the wire itself, and as one end of the wire is rigidly held the bending-point will be at about midway of the length of the wire. The vibrations are extremely rapid and continuous, and I have found in practice that the constant bending backward and forward of each wire at the same point gradually decreases its length and resiliency, and after comparatively short use crystallization takes place and the wire breaks at the point of bending. In carrying out my invention I propose to overcome this and other practical disadvantages in the construction of the apparatus by dispensing with the brushes as such and employing a series of grain-carriers formed of steel wire or similar material, the ends of the wires extending through or being confined in a yielding backing-piece, preferably of leather, so that the point of vibration will be at the extreme end of the wire, and any bending of the wire in its length is avoided. The different wires which compose the carrier are separated from each other for a distance slightly greater than the diameter of the cereal being treated. For instance, in a wheat-cleaning machine the various strands or wires will be so spaced that the grains of wheat can only enter between them lengthwise and each grain will be so held that when projected against the abrading-surface by the action of centrifugal force the end of the grain will be forced into contact with such surface.

In the accompanying drawings, Figure 1 is a sectional elevation on the line 1 1, Fig. 2, of a grain cleaning and scalping machine such as illustrated by said Letters Patent and to which my present invention may be applied. Fig. 2 is a transverse sectional elevation of the same on the line 2 2, Fig. 1. Fig. 3 is a detached perspective view of the operating-drum. Fig. 4 is a transverse sectional view of a portion of said drum, on an enlarged scale, and illustrating also the action of the machine. Fig. 5 is a sectional perspective view of a portion of one of the grain-carriers detached from the drum, and Fig. 6 is a sectional elevation of a modified form of carrier.

Referring to the drawings, A represents a suitable casing in which are formed bearings for shafts B, B', and B². On the upper shaft B is secured a drum C, composed for the main part of perforated sheet metal $c$ and carrying on its periphery a series of longitudinally-arranged grain-carriers D, formed of steel wire or similar material, and of a construction more particularly referred to hereinafter. One end of the cylinder at $c'$ is closed and the opposite end has an annular flange $c^2$, also made of perforated metal, and extending through a circular opening $a$ in the casing A of a machine.

Between the grain-carriers D the periphery of the drum is provided with a series of deflectors H, so arranged that when the drum is revolving the deflectors will cause the grain being treated to travel along the length of the cylinder, the rear end of each deflector extending for some distance beyond the forward end of the next deflector of the series, as shown in Fig. 3, so that any grain caught and carried by the first deflector will next be acted upon by the second deflector and then by the third deflector, and so on until the end of the drum has been reached.

Surrounding the drum C is a cylinder composed of alternately-arranged sections of abrading or grinding stones F and perforated sheet metal G, the perforations being large enough to permit the passage of the hulls of the grain, but not large enough to allow the grain to escape.

At one end of the casing is arranged a hopper J, through which the wheat or other grain is fed into the machine, the grain being discharged through an opening $j$ at the end of the cylinder and in the path of one or more small shovels $k$, extending some distance beyond the end of the drum and arranged in such manner as to pick up the grain from the place of delivery and carry it to the highest point of the drum, where it will be caught by the carriers D and the deflectors H and traversed through the machine, the grain being projected from the grain-carriers into contact with the abrading-surfaces of the grinding-stones and removing the outer covering or hull, which escapes through the perforations in the sheet metal G of the outer cylinder, and is thence carried away by a suitable air-blast. The deflectors H act to throw the grain against the perforated sheet metal, keeping the grain suspended in the air during the hulling operation and loose and separated for the passage of the air-blast, so that the grain will be kept perfectly cool.

The grain on reaching the end of the drum passes through a discharge-spout $l$ to a rumbler to be further treated, and when it arrives at this point the major portion of the hulls have been removed from the grains, and any small particles which may still cling to the surface are removed in the rumbler and the surface of the grain is cleansed and polished and in condition to be used as a food product or for the production of flour.

On the lower shaft B' is the drum N of the rumbler, said drum being formed of perforated sheet metal or wire-netting and having a closed end $n$ and an annular flange $n'$, formed of perforated sheet metal extending through a circular opening $a'$ in the casing A of the machine. On the surface of the drum N are a series of blades or deflectors P, which act to throw the grain being treated against a stationary cylinder M, surrounding the drum N and formed of perforated sheet metal to permit of the passage of any particles of hull which may be removed by the action of the rumbler-cylinder and the air-currents which traverse the apparatus.

The central shaft $B^2$ carries a suction-fan Q, the central portion or eye of which is in communication with the interior of the casing A and draws a continuous current of air through the openings $a$ and $a'$, which currents of air pass through the interior of the drums C and N and through the perforated sheet metal G of the upper cylinder and the perforated sheet metal M of the lower cylinder directly across the points where the grain is being acted upon and serve to carry off through the openings in the sheet metal any loose particles of hull which may be loosened by the abrading action of the brushes and stones F and by the rotating drum N.

On the shafts B and B' at points within the flanges $c^2$ and $n'$ of the upper and lower drums, respectively, are mounted fans I and O, which aid the larger fan in inducing the currents of air within the casing. The fans I and O are provided with small pulleys $i$ and $o$, respectively, which are driven from the shaft $B^2$ through the medium of belts $b^3$ from the pulley $b^2$. These smaller fans being mounted within the circular and perforated sheet-metal flanges of the drums will force air outwardly through the perforations in such flanges, and will also force the air into the interior of the hollow drum, and as such air cannot escape through the closed ends of the drums it is compelled to travel through the perforations of the drum and of the cylinders which surround them and to forcibly remove any loosened particles of hull. The treated grain finally escapes through a discharge-pipe S; but as at this point there is a possibility of some of the loosened hulls being carried down by the weight of the grain I provide in such pipe an opening R, and at a point diametrically opposite to such opening is arranged a pipe T, leading to the eye of the fan O in such manner that a current of air will be induced across the pipe S, through which the grain falls, and any particles of hulls being carried down by the grain will by the action of the fan be drawn up through the pipe T and thence discharged from the fan through its discharge-outlet $x$.

In order to provide for the running of the various parts, pulleys V, V', and $V^2$ are secured to the shafts B, B', and $B^2$, respectively, and over these pulleys passes a single belt $v$ from a main driving-pulley, so that it is necessary to employ but one belt to transmit power to all of the shafts.

The general construction of the apparatus so far described is similar to the apparatus forming the subject of the above-mentioned Letters Patent; but, as before mentioned, the wire brushes of such apparatus travel in or very nearly in contact with the abrading-surfaces and positively force the grains of wheat into contact with such abrading-surfaces. Such brushes were formed of tufts of very fine steel wire secured at one end in an iron or steel bar, and it is found in practice that after comparatively short time the strands of wire will break off and mingle with the grain.

In my present invention brushes, as such, are dispensed with, and in lieu thereof I employ carriers formed of wire strands of comparatively large diameter, and each strand or wire is separated from its fellows in such manner as to form a series of spaces of a width slightly greater than the smallest diameter of the grains of wheat or other cereal being treated, so that the latter can only enter between the strands longitudinally, the longest diameter of the cereal being parallel with the length of the strands, as shown more clearly in Fig. 4. The strands or wires $d$ are preferably formed in pairs and resemble staples, which are passed through openings formed in a backing-piece $d'$ of some yielding material, preferably leather, which is then secured to the metal or wood holding-bar $d^2$, which extends from end to end of the drum C. At the ends of the bars $d^2$ are formed pins $d^3$, which pass through openings in bars $d^4$, forming part of the end sections of the drum, and set-screws $d^5$ are employed to lock the pins, and thus hold the bar in the desired position. This construction permits of the adjustment of the bar from and toward the center of the drum.

The carriers D of the present invention are not brushes in the same sense as the brushes of the above-mentioned patent, as they do not travel in contact with the abrading-stones, the ends of the wire strands being at a distance from the abrading-surface preferably somewhat greater than the diameter of the grain. The grain being treated is received between the strands or wires and carried by them for a short distance until from the action of centrifugal force they are projected from between the strands into contact with the abrading-surface, and owing to the spacing of the strands the grains can only be received between them in the direction of their length and can consequently be projected only in a similar manner, the bearded ends of the grain being forced into contact with the abrading-surfaces and facilitating the removal of the outer hull without injury to the grain. As such strand is held in a yielding backing, the vibrations of the strands can take place only from the extreme end of the wire and not at any point in its length, so that the yielding of the wire for its full length prevents any deterioration such as occurs in wire strands which are confined in a metallic or other backing of non-yielding material. In some instances the strands may be slightly bent, as in Fig. 6, to give them greater rigidity.

It will be understood that grain-carriers such as form the subject of my present invention may be applied to any of the scalping or cleaning machines in which brushes and abrading stones are employed, the apparatus described being merely an illustration of one form of a machine to which the invention is applicable.

Having thus described my invention, what I claim, and desire to secure by Letters Patent, is—

1. In a grain cleaning and scalping machine, the combination with an abrading-cylinder of a rotatable drum mounted within the cylinder and grain-carriers mounted upon said drum, said carriers being contradistinguished from brushes and comprising wire strands radially secured at their lower ends to a yielding back to allow of a uniform vibration of each strand throughout its length while in operation, said strands being adapted to receive and carry the grain and to throw it by centrifugal force against the abrading-surface, the outer ends of the strands being out of contact and at a distance from the abrading-surface, substantially as described.

2. In a grain cleaning and scalping machine, the combination with an abrading-cylinder of a rotatable drum mounted within the cylinder and grain-carriers mounted upon said drum, said carriers being contradistinguished from brushes and comprising wire strands radially secured at their lower ends to a yielding back to allow of a uniform vibration of each strand throughout its length while in operation, said strands being spaced to receive and retain the grain in the direction of its length while being carried thereby, and to direct the grain when thrown by centrifugal force with the end against the abrading-surface, the outer ends of the strands being out of contact and at a distance from the abrading-surface, substantially as described.

3. In a grain cleaning and scalping machine, the combination of an abrading-cylinder, of a rotatable drum mounted within the cylinder and grain-carriers mounted upon said drum, said carriers being contradistinguished from brushes and comprising wire strands formed in pairs radially disposed and secured at their united ends yieldingly by being passed through a backing-piece of yielding material, said backing-piece being secured to a longitudinally-disposed holding-bar provided upon the circumference of the rotatable drum, said yielding connection providing for a uniform vibration of each strand throughout its length while in operation, said strands being spaced to receive and retain the grain in the direction of its length while being carried and to direct the course of the grain when thrown by centrifugal force with the end against the abrading-surface, the outer ends of the strands being out of contact with and at a distance from the abrading-surface, substantially as described.

In witness whereof I have hereunto set my hand this 11th day of March, A. D. 1897.

BELFORD G. ROYAL.

Witnesses:
JNO. E. PARKER,
ELIAS H. WHITE.